United States Patent
Kohout et al.

(10) Patent No.: US 10,425,434 B2
(45) Date of Patent: Sep. 24, 2019

(54) STATISTICAL FINGERPRINTING OF NETWORK TRAFFIC

(71) Applicant: Cisco Technology, Inc., San Jose, CA (US)

(72) Inventors: Jan Kohout, Roudnice Nad Labem (CZ); Tornas Pevny, Praha-Modrany (CZ)

(73) Assignee: Cisco Technology, Inc., San Jose, CA (US)

( * ) Notice: Subject to any disclaimer, the term of this patent is extended or adjusted under 35 U.S.C. 154(b) by 255 days.

(21) Appl. No.: 15/409,746

(22) Filed: Jan. 19, 2017

(65) Prior Publication Data
US 2018/0205750 A1 Jul. 19, 2018

(51) Int. Cl.
*H04L 29/06* (2006.01)
*G06F 21/55* (2013.01)
*G06N 20/00* (2019.01)

(52) U.S. Cl.
CPC ........ *H04L 63/1425* (2013.01); *G06F 21/554* (2013.01); *H04L 63/1408* (2013.01); *G06N 20/00* (2019.01)

(58) Field of Classification Search
CPC ............ H04L 63/1416; H04L 63/1425; G06N 99/005
See application file for complete search history.

(56) References Cited

U.S. PATENT DOCUMENTS

| 8,386,401 | B2 | 2/2013 | Virkar et al. |
| 8,561,184 | B1 * | 10/2013 | Marsa ................ H04L 67/22 726/22 |
| 9,037,518 | B2 | 5/2015 | Lakshminarayan et al. |
| 9,038,172 | B2 | 5/2015 | Miller et al. |

(Continued)

OTHER PUBLICATIONS

"Kernel embedding of distributions", https://en.wikipedia.org/wiki/Kernel_embedding_of_distributions, May 20, 2016, 13 pages, Wikimedia Foundation, Inc.

(Continued)

*Primary Examiner* — Shin-Hon (Eric) Chen
*Assistant Examiner* — Jessica J South
(74) *Attorney, Agent, or Firm* — Behmke Innovation Group LLC; James Behmke; Stephen D. LeBarron

(57) ABSTRACT

In one embodiment, a device in a network determines a set of lattice points in a multi-dimensional space constructed using message characteristics of messages exchanged between endpoint nodes in the network. The device uses the lattice points to derive vector representations of communication channels in the network with each of the communication channels being associated with one or more of the exchanged messages. A vector representation of an application in the network is based on one or more of the derived vector representations of one or more channels used to exchange messages associated with the application. The device identifies the application as associated with a first one of the channels by determining a measure of similarity between the first channel and the vector representation of the (Continued)

application that approximates a maximum mean discrepancy (MMD) distance between the message characteristics for the vector representations of the first channel and the application.

18 Claims, 6 Drawing Sheets

(56) References Cited

U.S. PATENT DOCUMENTS

| | | | |
|---|---|---|---|
| 2013/0144818 A1* | 6/2013 | Jebara | G06N 99/005 706/12 |
| 2014/0278239 A1 | 9/2014 | Macaro et al. | |
| 2015/0128263 A1* | 5/2015 | Raugas | H04L 63/1408 726/23 |
| 2015/0234955 A1 | 8/2015 | Joshi et al. | |
| 2015/0278710 A1* | 10/2015 | Hisada | G06N 99/005 706/12 |
| 2016/0191551 A1* | 6/2016 | Beauchesne | G06F 17/30525 726/23 |
| 2016/0359740 A1* | 12/2016 | Parandehgheibi | H04L 63/1425 |
| 2017/0149808 A1* | 5/2017 | Hamada | H04L 12/66 |
| 2017/0346839 A1* | 11/2017 | Peppe | G06F 21/577 |
| 2018/0004948 A1* | 1/2018 | Martin | H04L 63/1425 |
| 2018/0159879 A1* | 6/2018 | Mestha | H04L 63/1425 |

OTHER PUBLICATIONS

Dusi, et al., "Tunnel Hunter: Detecting application-layer tunnels with statistical fingerprinting", Computer Networks: The International Journal of Computer and Telecommunications Networking, vol. 53 Issue 1, Jan. 2009, pp. 81-97, Elsevier North-Holland, Inc.

Gretton, et al., "A Kernel Two-Sample Test", Journal of Machine Learning Research 13, 51 pages, 2012, Arthur Gretton, Karsten M. Borgwardt, Malte J. Rasch, Bernhard Schölkopf and Alexander Smola.

Herrmann, et al., "Website Fingerprinting: Attacking Popular Privacy Enhancing Technologies with the Multinomial Naïve-Bayes Classifier", CCSW'09, Nov. 13, 2009, 11 pages, ACM.

Hjelmvik, et al., "Statistical Protocol IDentification with SPID: Preliminary Results", 5 pages, 2009, Swedish National Computer Networking Workshop.

* cited by examiner

STATISTICAL FINGERPRINTING OF NETWORK TRAFFIC

TECHNICAL FIELD

The present disclosure relates generally to computer networks, and, more particularly, to the statistical fingerprinting of network traffic.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

To further complicate the analysis of network traffic to discern between different types of traffic, the use of encryption is also steadily increasing. Notably, many websites are now using encryption, thereby protecting the payloads of their corresponding traffic from inspection. Malicious entities are also leveraging this fact to conceal malicious traffic using encryption.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
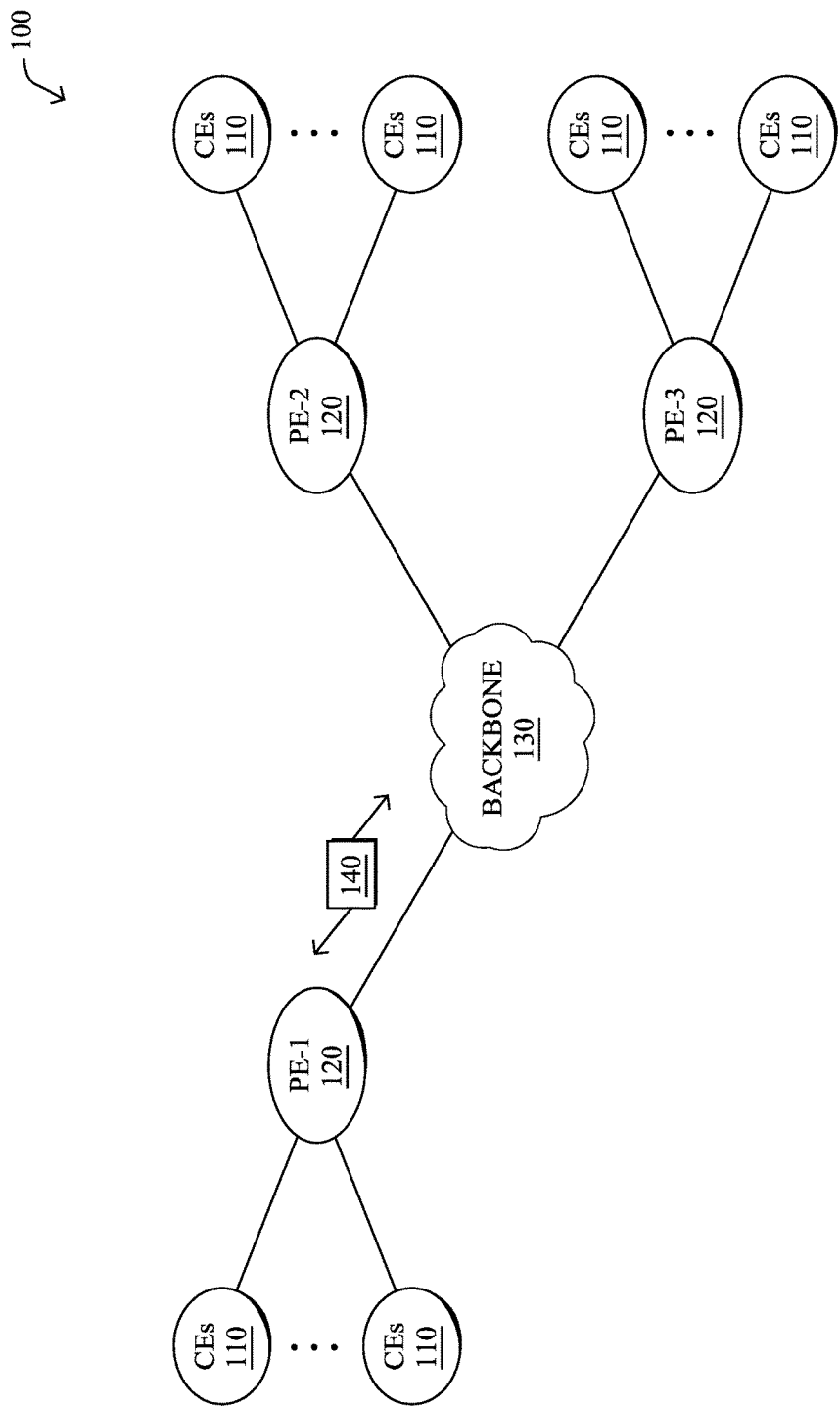
FIGS. 1A-1B illustrate an example communication network.

According to one or more embodiments of the disclosure, In one embodiment, a device in a network determines a set of lattice points in a multi-dimensional space constructed using message characteristics of messages exchanged between endpoint nodes in the network. The device uses the lattice points to derive vector representations of communication channels in the network with each of the communication channels being associated with one or more of the exchanged messages. A vector representation of an application in the network is based on one or more of the derived vector representations of one or more channels used to exchange messages associated with the application. The device identifies the application as associated with a first one of the communication channels by determining a measure of similarity between the first communication channel and the vector representation of the application. The measure of similarity between the first communication channel and the vector representation of the application is based on a Euclidean distance between the vector representations of the first channel and the application and approximates a maximum mean discrepancy (MMD) distance between the message characteristics for the vector representations of the first channel and the application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
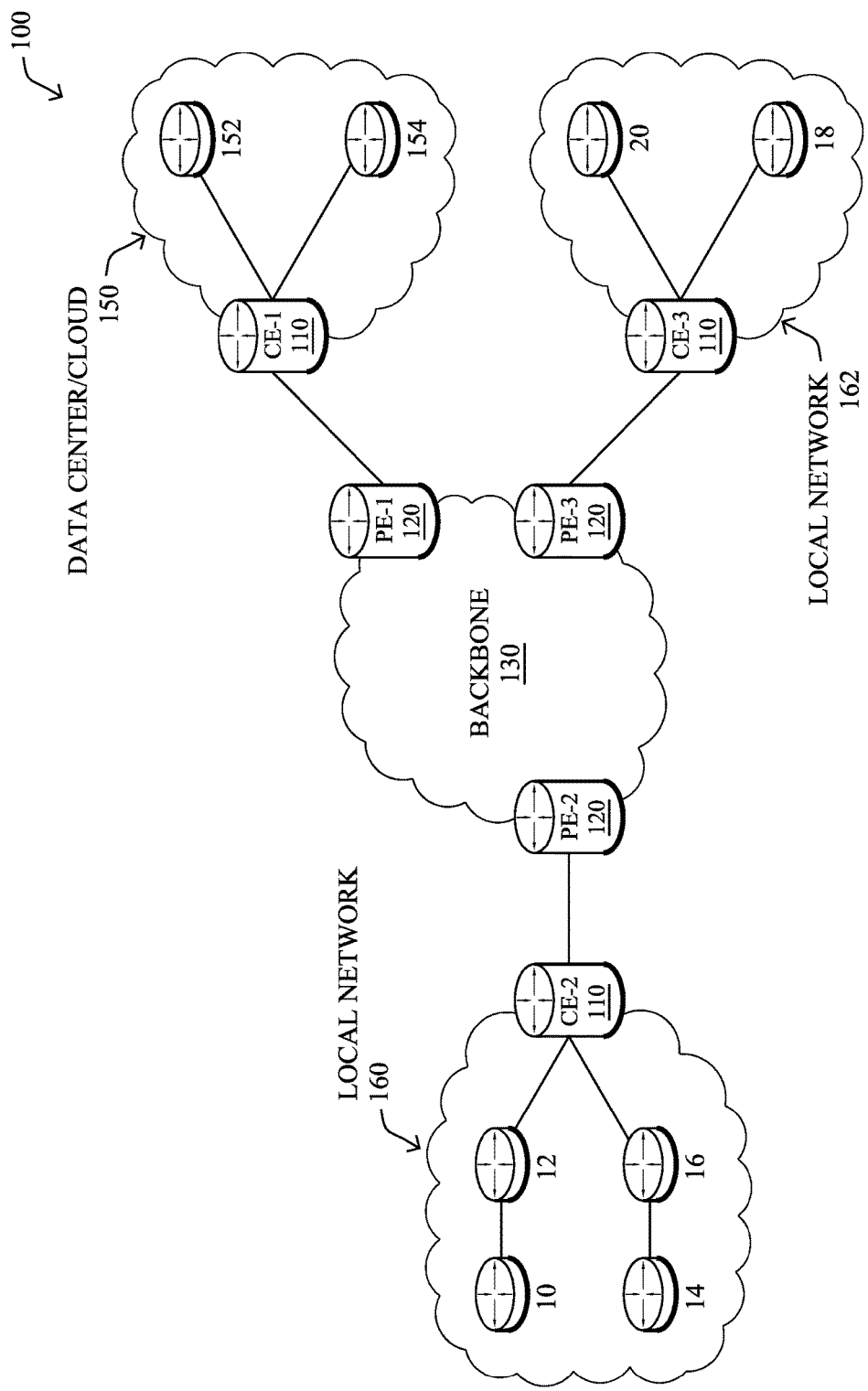

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
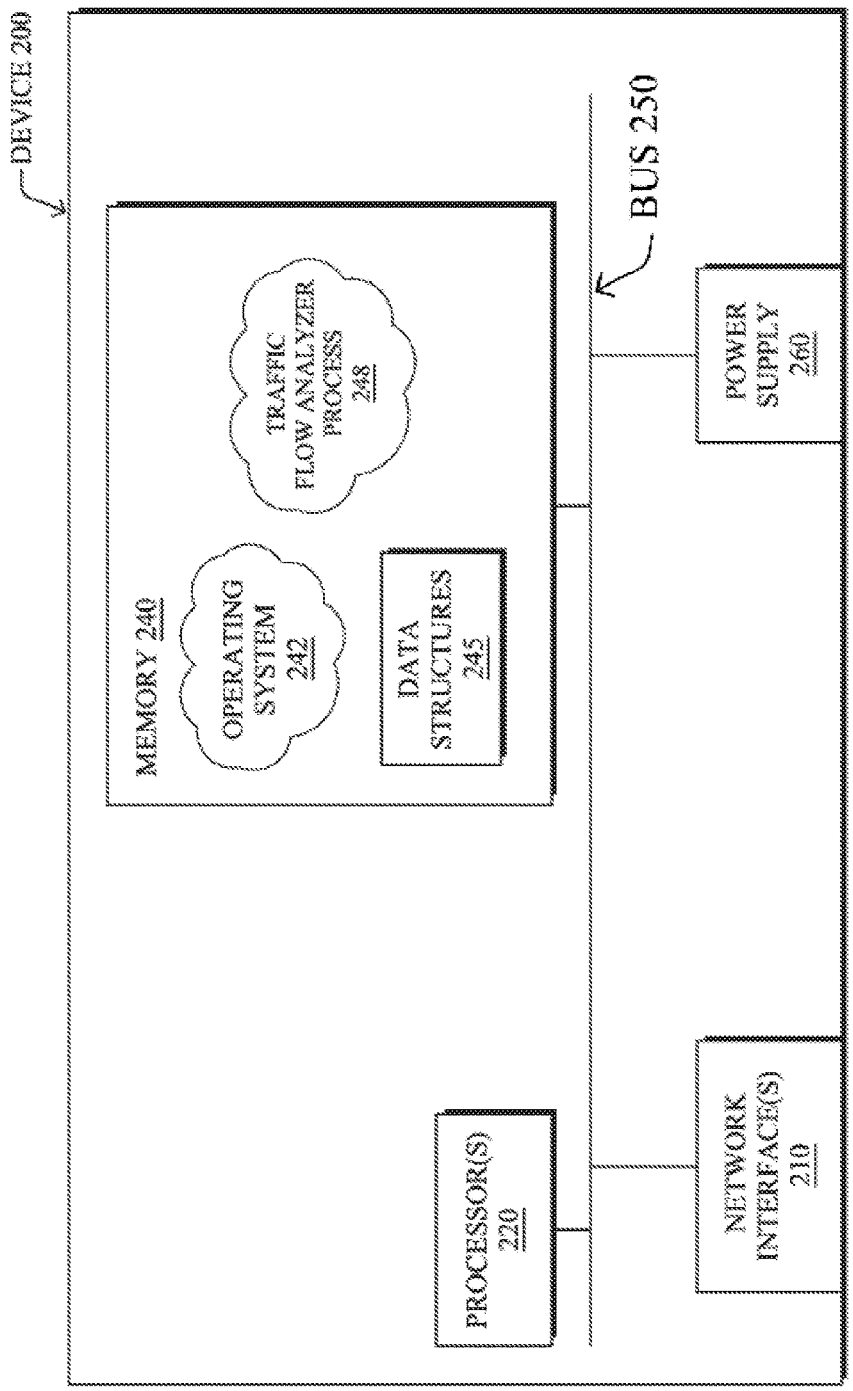
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic flow analyzer process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Traffic flow analyzer process 248 includes computer executable instructions that, when executed by processor(s) 220, cause device 200 to analyze available information about a traffic flow to discern the traffic flow type of the flow under analysis. In some embodiments, traffic flow analyzer process 248 may discern between different types of benign traffic flows, such as the various applications associated with the flows. In further embodiments, traffic flow analyzer process 248 may discern between benign and malicious traffic flows and may even identify the specific type of a malicious flow (e.g., the specific family of malware associated with the flow).

Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic flow analyzer process 248 may analyze traffic flow data to detect anomalous or otherwise undesirable behaviors (e.g., malfunctioning devices, misconfigured devices, etc.), traffic pattern changes (e.g., a group of hosts begin sending significantly more or less traffic), or the like.

According to various embodiments, traffic flow analyzer process 248 may employ any number of machine learning techniques, to assess a given traffic flow in the network. In general, machine learning is concerned with the design and the development of techniques that receive empirical data as input (e.g., traffic data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a, b, c such that the number of misclassified points is minimal. After this optimization/learning phase, traffic flow analyzer process 248 can use the model M to classify new data points, such as information regarding new traffic flows in the network. Often, M is a statistical model, and the cost function is inversely proportional to the likelihood of M, given the input data.

In various embodiments, traffic flow analyzer process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample traffic data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic flow analyzer process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic flow analyzer process 248 may assess the captured traffic data on a per-flow basis. In other embodiments, traffic flow analyzer process 248 may assess traffic data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
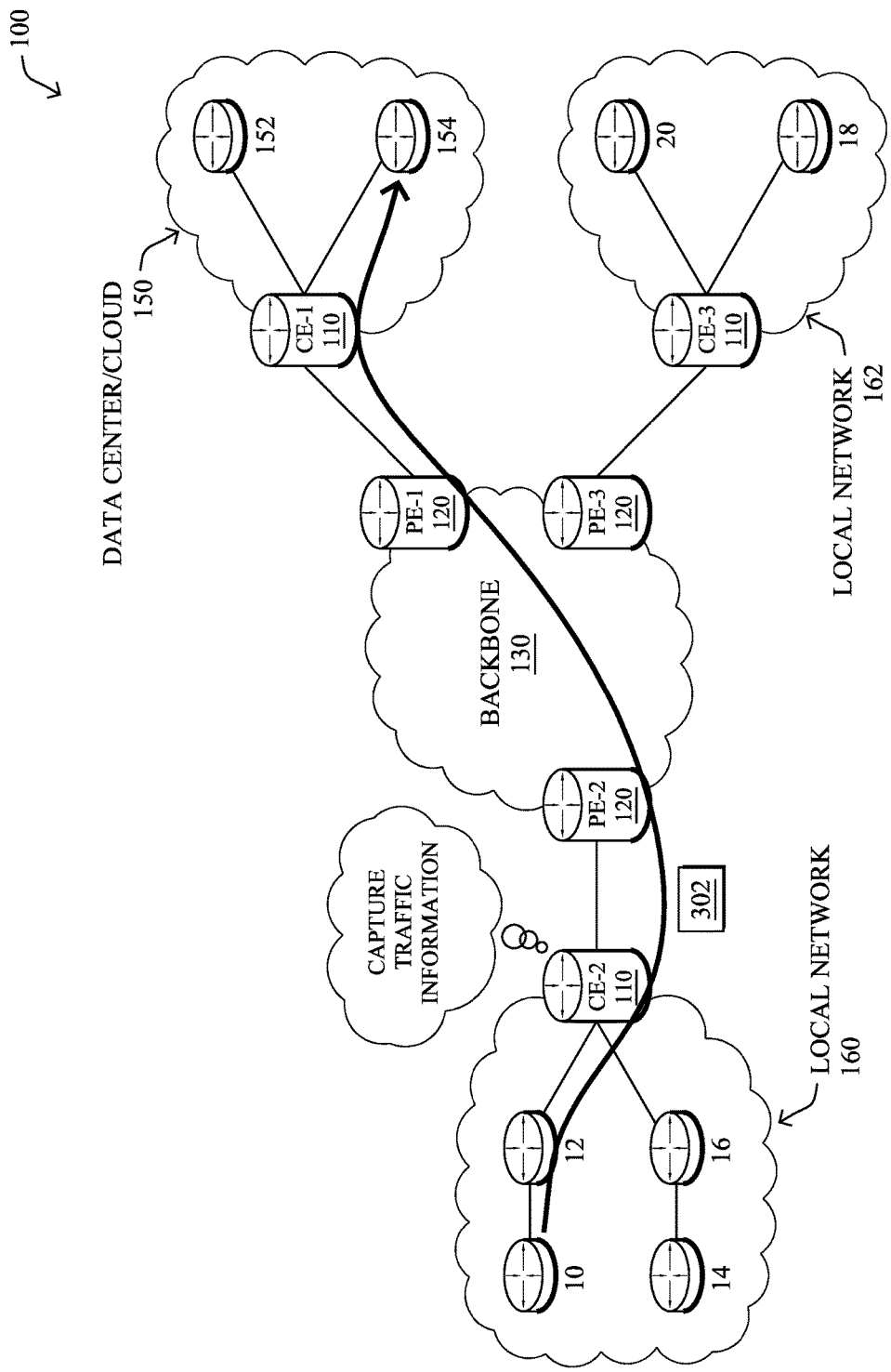
FIG. 3 illustrates an example of a network device capturing traffic data.

As shown in FIG. 3, various mechanisms can be leveraged to capture information about traffic in a network. For example, consider the case in which client node 10 initiates a traffic flow with remote server 154 that includes any number of packets 302. Any number of networking devices along the path of the flow may analyze and assess packet 302, to capture traffic data regarding the traffic flow. For example, as shown, consider the case of edge router CE-2 through which the traffic between node 10 and server 154 flows. While the packets 302 flow through edge router CE-2, router CE-2 may capture traffic data regarding the flow. Notably, traffic flows can be monitored in many cases through the use of a tap or Switch Port Analyzer (SPAN).

In some embodiments, a networking device may analyze packet headers, to capture information about the traffic flow. For example, router CE-2 may capture the source address and/or port of host node 10, the destination address and/or port of server 154, the protocol(s) used by packet 302, or other header information by analyzing the header of a packet 302. In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the traffic data may also compute any number of statistics or metrics regarding the traffic flow. For example, CE-2 may determine the start time, end time, duration, packet size(s), the distribution of bytes within a flow, etc., associated with the traffic flow by observing packets 302.

In the specific case of encrypted traffic, the networking device that captures the traffic data may also be a proxy device, in some embodiments. For example, CE-2 or another intermediary device may act as a man-in-the-middle between endpoints, to intercept the encryption credentials used and simulate responses from each respective node. In doing so, the device may be able to decrypt and analyze the payloads of the packets. Alternatively, in further embodiments, the device may simply capture header information from encrypted traffic, such as Transport Layer Security (TLS) header information.

As noted above, monitoring communications between network hosts can play an important role in the security and operation of computer networks. In the case of a communication being identified as associated with a malware-related application, the analysis device can, in turn, cause the performance of any number of mitigation actions to be performed. For example, the device may cause the corresponding traffic to be blocked, a notification to be sent (e.g., to an administrator or user regarding the possibility of an infected device), etc. Conversely, in the case of network performance, the traffic analyzer can leverage insight into the application associated with certain traffic to reserve network resources for the traffic, prioritize or deprioritize the traffic, etc.

Statistical Fingerprinting of Network Traffic

The techniques herein introduce a method to represent network traffic traces that allows for better identification of the applications associated with the traffic. In some aspects, the techniques herein use an approximated version of a kernel two-sample test by treating each communication channel/trace as a sample from some probability distribution. The proposed representation is in the form of real vectors of fixed dimension, which allows for their usage by various types of classifiers (e.g., a k-NN classifier, etc.) or other machine learning-based processes that analyze traffic to identify the application(s) associated with the traffic. For example, in some aspects, the techniques herein may leverage a non-parametric test of equality of two probability distributions as a distance measure between communication traces, to identify the underlying application.

Specifically, according to one or more embodiments of the disclosure as described in detail below, In one embodiment, a device in a network determines a set of lattice points in a multi-dimensional space constructed using message characteristics of messages exchanged between endpoint nodes in the network. The device uses the lattice points to derive vector representations of communication channels in the network with each of the communication channels being associated with one or more of the exchanged messages. A vector representation of an application in the network is based on one or more of the derived vector representations of one or more channels used to exchange messages associated with the application. The device identifies the application as associated with a first one of the communication channels by determining a measure of similarity between the first communication channel and the vector representation of the application. The measure of similarity between the first communication channel and the vector representation of the application is based on a Euclidean distance between the vector representations of the first channel and the application and approximates a maximum mean discrepancy (MMD) distance between the message characteristics for the vector representations of the first channel and the application.

Illustratively, the techniques described herein may be performed by hardware, software, and/or firmware, such as in accordance with the traffic flow analyzer process 248, which may include computer executable instructions executed by the processor 220 (or independent processor of interfaces 210) to perform functions relating to the techniques described herein.

Figure 4:
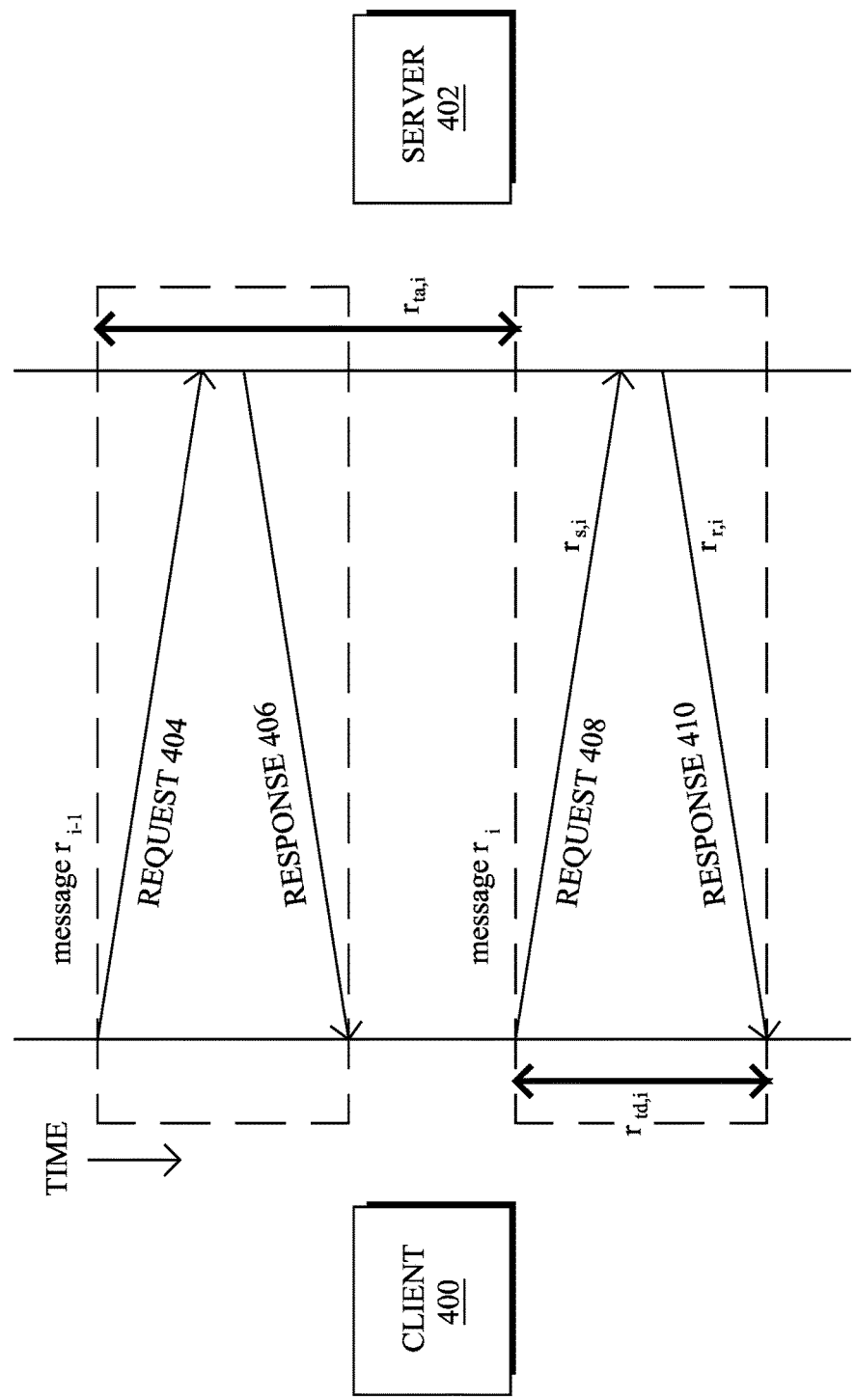
FIG. 4 illustrates an example communication channel.

Operationally, FIG. 4 illustrates an example communication channel, in accordance with various embodiments herein. In general, a communication channel refers to a set of repeated communications between two given network nodes/hosts that have exchanged more than a minimal number of messages. For example, as shown, consider the case of a client device 400 that is in communication with a remote server 402. Client 400 and server 402 may exchange any number of messages that may comprise a request and/or a response. For example, individual messages/traffic exchanged between client 400 and server 402 may include, but are not limited to, HTTP(S) request-response pairs, a single TCP or UDP communication, a NetFlow message, or any other type of network traffic.

An intermediate device located along the path between client 400 and server 402 (e.g., a CE router 110, a cloud service device, etc.) may capture various traffic data regarding the communication channel shown. For example, such an intermediate device may capture traffic data regarding the $i^{th}$ message exchange, $r_i$, between client device 400 and server 402. Message $r_i$ may comprise a request 408 sent from client 400 to server 402 and a response 410 sent from server 402 to client 400. Similarly, the prior message, $r_{i-1}$, may include a request 404 and a response 406.

The intermediate device between client 400 and server 402 may capture any or all of the following traffic data characteristics regarding message

- The number of bytes in request 408 ($r_{s,i}$),
- The number of bytes in response 410 ($r_{r,i}$),
- The time duration of the request-response (R-R) loop of message $r_i$($r_{td,i}$),
- The inter-arrival time between when client 400 sent request 404 of message $r_{i-1}$ and when client 400 sent request 408 of message $r_i$ ($r_{ta,i}$), and/or
- Header information or any other information available from requests or responses 404-410, themselves.

As would be appreciated, the intermediate device between client 400 and server 402 may capture other features regarding the communication channel, as well, in further embodiments.

To properly analyze the observed network traffic (e.g., to identify the application associated with the traffic), an appropriate representation of captured communication traces is crucial. The representation must be able to capture important patterns of their behavior, while also allowing effective manipulation. Thus, in some embodiments, the network communication channel associated with an application can be treated as a set of independent messages (e.g., packets, NetFlow or IPFIX records, web requests/responses, etc.). For example, if the traffic flow data is captured in a NetFlow or IPFIX record, the messages may be the individual packets sent and received in that record.

In some embodiments, the analyzing device may represent each message of a communication channel as a set of N-number of observed characteristics/features of the message, such as its size, timing, header information, etc. As would be appreciated, the number of different characteristics assessed may be varied and may depend on which features/ traffic characteristics are captured in the traffic data. In other words, each message may be represented as an N-dimensional point in a multi-dimensional, metric space, also referred to herein as the "message space." In turn, each communication channel may be viewed as the set of M-number, N-dimensional points that represent the constituent messages of the channel.

From the above representations, each communication channel can be treated as a sample from an unknown probability distribution, for purpose of analyzing the traffic of the channel. The individual messages in the channel, represented by the N-dimensional points in the message space, are then realizations of a random variable with the distribution. In other words, each message observed in a channel can be treated as a realization of the probability distribution p ∈ P, where P is the set of all probability distributions of all channels. For example, a channel a may be characterized by its probability distribution $p_a$∈P, a channel b may be characterized by its probability distribution $p_b$∈P, etc. Note that any p from P is almost never known exactly, but is rather observed through the finite set of observed messages.

According to various embodiments, the traffic analyzer may derive the fingerprint of a given communication channel based on a measure of similarity between the channel and one or more other channels. This similarity metric may be, for example, a "distance" function between the two probability distributions $p_a$ and $p_b$ of the compared channels. In some embodiments, the traffic analyzer may compare communication channels using the maximum mean discrepancy (MMD) between the channels. In general, the MMD is a statistical distance measurement that is based on kernel embedding of probability distributions, which is also sometimes known as mean mapping.

Generally, mean mapping/kernel embedding of distributions refers to a class of statistical analysis techniques that represent a probability distribution as an element of a reproducing kernel Hilbert space (RKHS). Such techniques make use of the concept of a kernel, which is a function that can uniquely represent a given RKHS. As would be appreciated, the term "kernel" is used herein in the statistical sense (e.g., as opposed to operating system kernels). These statistical approaches have given rise to a number of kernel methods in the field of machine learning which include, e.g., SVMs and the like.

While MMD-based tests are well suited for comparing communication channels, the computation of the test in its original form is often too computationally intensive for many network implementations. For example, an intermediary traffic analyzer in the network may not be able to assess a large number of traces in a short amount of time using such a test. Thus, in further embodiments, the techniques herein introduce an approximated form of the MMD-based test that can be used to compare communication channels. To do so, communication traces/channels are represented as real vectors of finite dimension and the value of the MMD distance is approximated by the Euclidean distance between these vectors, which is much cheaper to compute from a computational standpoint.

In various embodiments, the traffic analyzer may first determine a set L of lattice points in the message space, to approximate the MMD between communication channels. The cardinality of the set L is the number of dimensions of the target representation of each communication channel, as detailed below. In other words, the set L is a set of N-dimensional points selected from the same message space. For example, in one embodiment, the device may determine the set L of lattice points from the message space using clustering (e.g., k-means, etc.) and use the resulting cluster centroids as the lattice points.

In another embodiment, the device may determine the set of lattice points using a greedy process that computes the epsilon-coverage of the message space for some preset epsilon ε. Notably, given a set of training set of messages M, the device may attempt to find its subset Mε⊆M such that the following holds true:

$\forall m \in M : \forall m' \in M_\varepsilon : \|m-m'\|_2 \leq \varepsilon$

Example pseudocode to determine the lattice points in a greedy manner to satisfy the above constraint is as follows:

```
procedure Coverage (M, ε)
    M_ε ← {m}, m randomly selected from M
    for m ∈ M do
        if ∀m' ∈ M_ε: ||m − m'|| > ε then
            M_ε ← M_ε ∪ {m}
        end if
    end for
    return M_ε
end procedure
```

Once the device has computed the set L of lattice points from the message space with cardinality z, the device may use the lattice points to represent a given communication channel as follows:

$channel_{rep} = C^{-1} * (1/M) * \Sigma_{m\ in\ channel}(k(l_1,m), \ldots, k(l_z,m))$, where $l_1, \ldots, l_p$ are points from the lattice set L, k is a selected kernel function (e.g., the Gaussian kernel, etc.), m denotes individual messages from the represented channel, and M is the total number of messages observed for the channel. In addition, C is a z×z square matrix obtained by the Cholesky decomposition of a kernel matrix K computed on the set L in the following way:

$K_{ij} = k(l_i, l_j)$ $C * C^T = K$

The resulting representation $channel_{rep}$ is then in the form of a z-dimensional real vector.

In various embodiments, by representing two communication channels as vectors based on the lattice points in the message space, the traffic flow analyzer may approximate the MMD distances between the mean maps of the underlying probability distributions as the Euclidean distance between the two vectors. As would be appreciated, calculating Euclidean distances is less computationally intensive than calculating MMD distances. In addition, the lattice points from the message space can be pre-computed in advance, in some cases.

Using the Euclidean distance between the vector representations of the communication channels, the device may also identify the application associated with a particular channel. For example, in one embodiment, the device may use the distances along with known application information to train a machine learning-based classifier. Notably, a set of channels that convey messages for a known application can be used to form a vector representation of the application (e.g., by clustering or otherwise aggregating the vector parameters for these channels). Such a classifier may, based on the fingerprint of the communication channel under analysis, classify the channel to identify the application associated with the channel. In other words, if the represented channel under analysis is similar to that of one or more other channels for which the application is already known, the device may determine that the channel under analysis is also associated with this application. As would be appreciated, any number of classifiers or other machine learning processes that rely on pairwise distances between samples can leverage the approximated MMD distances herein.

In turn, the device may use the identified application to cause one or more actions to be taken in the network regarding the channel under analysis. For example, if the channel is identified as associated with a malware-related application, the device may cause any number of mitigation actions to be taken (e.g., blocking the traffic of the channel, sending a notification, etc.).

Preliminary testing of the techniques herein was conducted using a k-NN classifier and compared against a number of existing application-identification techniques. In one experiment, the individual messages were defined as single datagrams and sizes and inter-arrival times were used as features. Using the constructed k-NN classifier based on the techniques herein, an average accuracy of 67.19% was observed, whereas the average accuracy for the existing techniques ranged from 33.43% to 58.31%. In a second experiment, the individual messages were defined as NetFlow records and the number of transferred bytes, the number of packets, and their durations were used as features. Again, the classifier based on the techniques herein demonstrated an improvement over the existing techniques, having an average accuracy of 53.26%, in contrast to the existing techniques that demonstrated average accuracies between 21.8% and 44.17%.

Figure 5:
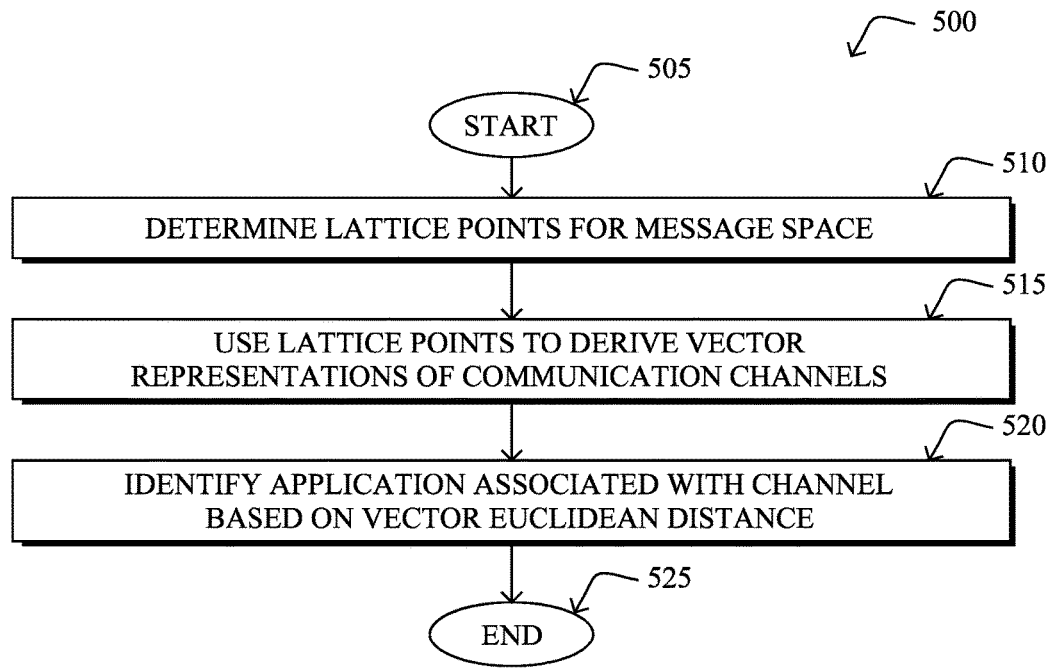
FIG. 5 illustrates an example simplified procedure for identifying an application associated with a communication channel.

FIG. 5 illustrates an example simplified procedure for identifying an application associated with a communication channel in a network, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may determine a set of lattice points in the message space for observed traffic in the network. Generally, the message space is a multi-dimensional space constructed using message characteristics of the messages exchanged between endpoint nodes in the network (e.g., in terms of timing, sizes, etc.). In one embodiment, the device may determine the lattice points of the space by calculating the epsilon-coverage of the multi-dimensional space. In another embodiment, the device may calculate cluster centroids in the multi-dimensional space.

At step 515, as detailed above, the device may use the lattice points to derive vector representations of the observed communication channels. Each of the communication channels may be associated with one or more of the exchanged messages (e.g., the packets sent between two endpoint nodes using a particular port, etc.). In various embodiments, the Euclidean distance between any two of the vector representations approximates a maximum mean discrepancy (MMD) distance between the message characteristics for the two corresponding communication channels.

At step 520, the device may identify an application as associated with a first one of the communication channels based on a measure of similarity between the first channel and a vector representation of the application. The vector representation of the application may be formed from the vector representation(s) of the channels in step 515 that are used to exchange messages associated with the application. For example, if only a single channel conveys the application's messages, the vector representation of the application itself may simply be the vector representation of that channel. However, if multiple channels convey the application's messages, the vector representation of the application may be, for example, a computed centroid or other aggregate of the vector representations of these channels.

In various embodiments, the measure of similarity may be based on the Euclidean distance between the vector representation of the first channel and the vector representation of the application. For example, in some embodiments, the device may execute a machine learning-based classifier that leverages the distance(s) to classify a given communication channel as being associated with a particular application. Based on the identification, the device may then cause any number of actions to be taken in the network, such as blocking malware-related traffic, generating an alert, configuring resources, etc. Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for unsupervised representations of communication channels/traces in a network that can be leveraged for application identification. Further, the techniques herein can be used independently on the input data and/or on different layers of the TCP/IP stack. Preliminary testing has also shown the techniques herein to outperform existing application identification techniques in terms of average accuracy.

While there have been shown and described illustrative embodiments that provide for the statistical fingerprinting of network traffic, it is to be understood that various other adaptations and modifications may be made within the spirit and scope of the embodiments herein. For example, while certain embodiments are described herein with respect to using certain machine learning techniques for purposes of application identification, the techniques are not limited as such and may be used for other functions, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a device in a network, a set of lattice points in a multi-dimensional space constructed using message characteristics of messages exchanged between endpoint nodes in the network;
    using, by the device, the lattice points to derive vector representations of communication channels in the network with each of the communication channels being associated with one or more of the exchanged messages, wherein a vector representation of an application in the network is based on one or more of the derived vector representations of one or more channels used to exchange messages associated with the application;
    identifying, by the device, the application as associated with a first one of the communication channels by determining a measure of similarity between the first communication channel and the vector representation of the application, wherein the measure of similarity between the first communication channel and the vector representation of the application is determined based on an Euclidean distance between the vector representations of the first channel and the application, the Euclidean distance used as an approximation of a maximum mean discrepancy (MMD) distance between the message characteristics for the vector representations of the first channel and the application; and
    causing, by the device, performance of a mitigation action in the network based on the identified application being malware-related.

2. The method as in claim 1, further comprising:
    receiving, at the device, an indication of the application being associated with the one or more of the communication channels.

3. The method as in claim 1, wherein messages associated with the first communication channel use Transport Layer Security (TLS).

4. The method as in claim 1, wherein the application associated with the first communication channel is identified using a machine learning-based classifier.

5. The method as in claim 1, wherein determining the set of lattice points comprises:
    calculating, by the device, epsilon-coverage of the multi-dimensional space constructed using the message characteristics.

6. The method as in claim 1, wherein determining the set of lattice points comprises:
    calculating, by the device, cluster centroids in the multi-dimensional space constructed using the message characteristics.

7. The method as in claim 1, wherein using the lattice points to derive the vector representations of the communication channels comprises:
    performing, by the device, a Cholesky decomposition of a kernel matrix computed on the set of lattice points.

8. The method as in claim 1, wherein using the lattice points to derive the vector representation of the first communication channel comprises:
    applying, by the device, a selected kernel function to the lattice points and messages associated with the first communication channel.

9. An apparatus, comprising:
    one or more network interfaces to communicate with a network;
    a processor coupled to the network interfaces and configured to execute one or more processes; and
    a memory configured to store a process executable by the processor, the process when executed operable to:
        determine a set of lattice points in a multi-dimensional space constructed using message characteristics of messages exchanged between endpoint nodes in the network;
        use the lattice points to derive vector representations of communication channels in the network with each of the communication channels being associated with one or more of the exchanged messages, wherein a vector representation of an application in the network is based on one or more of the derived vector representations of one or more channels used to exchange messages associated with the application;

identify the application as associated with a first one of the communication channels by determining a measure of similarity between the first communication channel and the vector representation of the application, wherein the measure of similarity between the first communication channel and the vector representation of the application is determined based on an Euclidean distance between the vector representations of the first channel and the application, the Euclidean distance used as an approximation of a maximum mean discrepancy (MMD) distance between the message characteristics for the vector representations of the first channel and the application; and cause performance of a mitigation action in the network based on the identified application being malware-related.

10. The apparatus as in claim 9, wherein the process when executed is further operable to:

receive an indication of the application being associated with the one or more of the communication channels.

11. The apparatus as in claim 9, wherein messages associated with the first communication channel use Transport Layer Security (TLS).

12. The apparatus as in claim 9, wherein the application associated with the first communication channel is identified using a machine learning-based classifier.

13. The apparatus as in claim 9, wherein the apparatus determines the set of lattice points by:

calculating epsilon-coverage of the multi-dimensional space constructed using the message characteristics.

14. The apparatus as in claim 9, wherein the apparatus determines the set of lattice points by:

calculating cluster centroids in the multi-dimensional space constructed using the message characteristics.

15. The apparatus as in claim 9, wherein the apparatus uses the lattice points to derive the vector representations of the communication channels by:

performing a Cholesky decomposition of a kernel matrix computed on the set of lattice points.

16. The apparatus as in claim 9, wherein the apparatus uses the lattice points to derive the vector representation of the first communication channel by:

applying a selected kernel function to the lattice points and messages associated with the first communication channel.

17. A tangible, non-transitory, computer-readable medium storing program instructions that cause a device in a network to execute a process comprising:

determining, by the device, a set of lattice points in a multi-dimensional space constructed using message characteristics of messages exchanged between endpoint nodes in the network;

using, by the device, the lattice points to derive vector representations of communication channels in the network with each of the communication channels being associated with one or more of the exchanged messages, wherein a vector representation of an application in the network is based on one or more of the derived vector representations of one or more channels used to exchange messages associated with the application;

identifying, by the device, the application as associated with a first one of the communication channels by determining a measure of similarity between the first communication channel and the vector representation of the application, wherein the measure of similarity between the first communication channel and the vector representation of the application is determined based on an Euclidean distance between the vector representations of the first channel and the application, the Euclidean distance used as an approximation of a maximum mean discrepancy (MMD) distance between the message characteristics for the vector representations of the first channel and the application; and causing, by the device, performance of a mitigation action in the network based on the identified application being malware-related.

18. The computer-readable medium as in claim 17, wherein the application associated with the first communication channel is identified using a machine learning-based classifier.

* * * * *

UNITED STATES PATENT AND TRADEMARK OFFICE
CERTIFICATE OF CORRECTION

PATENT NO. : 10,425,434 B2
APPLICATION NO. : 15/409746
DATED : September 24, 2019
INVENTOR(S) : Jan Kohout It is certified that error appears in the above-identified patent and that said Letters Patent is hereby corrected as shown below:

In the Specification

Column 9, Line 34, please amend as shown:
characteristics regarding message $r_i$:

Column 10, Line 14, please amend as shown:
distribution $p \in P$, where P is the set of all probability Column 10, Line 26, please amend as shown:
probability distributions $p_a$ and $p_b$ of the compared channels.

Column 11, Line 9, please amend as shown:
$\forall m \in M : \exists m' \in M_\varepsilon : \|m - m'\|_2 < \varepsilon$ Column 11, Line 26, please amend as shown:
$channel_{rep} = C^{-1} * (1/M) * \Sigma_{m \text{ in channel}} (k(l1,m), ..., k(lz,m))$, Signed and Sealed this
Fourth Day of February, 2020

Andrei Iancu
*Director of the United States Patent and Trademark Office*